Patented Apr. 13, 1943

2,316,525

UNITED STATES PATENT OFFICE 2,316,525

CELLULOSIC MATERIALS AND METHOD FOR PRODUCING SAME

Ambrose McAlevy, Wilmington, Del., assignor to E. I. du Pont de Nemours & Company, Wilmington, Del., a corporation of Delaware No Drawing. Application January 19, 1940, Serial No. 314,657

9 Claims. (Cl. 260—227)

The present invention relates to the production of esters of cellulose, for example, cellulose acetate. More particularly, it relates to the reaction of cellulose with an alkyl ester of an aliphatic acid in the presence of a boron trifluoride complex compound.

Heretofore, in the production of cellulose acetate, it has been considered necessary to esterify the cellulose by reacting the latter with acetic anhydride.

In the preparation of cellulose acetate, according to the conventional, commercially practiced processes, it is considered essential to use an excess of acetic anhydride over that amount theoretically necessary to react with the hydroxyl groups of the cellulose.

It has been known, heretofore, that cellulose esters may be prepared in an esterification bath in which boron trifluoride is employed as a catalyst. In such previously known esterification processes, however, the boron trifluoride is used in only small, catalytically functioning quantities, for example, of the order of 2%, based on the weight of the cellulose. As a consequence, previously known processes employing boron trifluoride as the catalyst necessitated the customary use of an excess quantity of acetic anhydride as the acetylating agent.

It has now been found that cellulose acetate and similar organic esters of cellulose can be very satisfactorily prepared by reacting cellulose with an esterfication mixture in which the acetic anhydride is present in less amount than that theoretically necessary to react with the cellulose, or even in the absence of acetic anhydride, or other aliphatic anhydride.

It is, therefore, an object of the present invention to esterify cellulose with an esterification mixture containing, as an esterification reactant, an alkyl ester of an aliphatic acid.

It is another object of the present invention to esterify cellulose in the presence of a boron trifluoride complex with an esterification mixture containing, as an esterification reactant, an alkyl ester of an aliphatic acid, and containing less than that amount of an aliphatic anhydride necessary to react with the hydroxyl groups of the cellulose.

Other objects of the invention will appear hereinafter.

The objects of the invention may be accomplished, in general, by esterifying cellulose, in the presence of boron trifluoride, with an esterification mixture, containing, as an esterification reactant, an alkyl ester of an aliphatic acid, and containing less than that amount of an aliphatic anhydride necessary to react with the hydroxyl groups of the cellulose.

The following examples illustrate specific embodiments of the invention, it being understood that the invention is not limited to the details set forth in these examples. Unless otherwise indicated, the parts given are parts by weight.

Example I 5 parts of cellulose were dissolved in 162 parts of water-boron trifluoride complex [$(H_2O)_2.BF_3$] and 35 parts methyl formate. The reaction temperature was maintained at 29° C. and the mixture stirred for 3 minutes, which resulted in the formation of a clear, viscous solution. To the solution was added 200 parts methyl formate, which caused a precipitation of cellulose formate from the solution. The cellulose formate was removed from the reaction mixture rapidly by filtration, washed with methyl formate, and dried under vacuum. The resulting cellulose formate was found to be completely soluble in formic acid, and therefore contained no unreacted cellulose. The yield was practically quantitative. The filtrate distilled at diminished pressure for removal of excess methyl formate yielded a residue comprising water-boron trifluoride complex [$(H_2O)_2.BF_3$] and a small amount of methanol. This recovered water-boron trifluoride complex may be used over and over again for the preparation of the cellulose ester.

The formic acid solution of cellulose formate made in this example when coated on a surface, gave, upon evaporation, a film which had a molecular weight of 31,600 and which was determined to be the mono-formate of cellulose. This film had the property of gradually losing formic acid, thereby being transformed to a clear tough film of regenerated cellulose. The film also had the property of being converted into a neutral, clear tough film when dipped in aqueous ammonia and water.

Example II 2 parts of cellulose were dissolved in 20 parts of water-boron trifluoride complex [$(H_2O)_2.BF_3$] and 5 parts methyl methoxy acetate. The addition of the reaction mixture to a large volume of water causes precipitation of the cellulose methoxy acetate.

Cellulose acetate may likewise be produced by use of methyl acetate instead of methyl methoxy acetate. The formation of cellulose acetate by this manner may be enhanced by the addition of a small quantity of acetic anhydride, i. e., a quantity less than that theoretically necessary to react with the hydroxyl groups of the cellulose.

Example III 10 parts of cellulose were reacted in a liquid containing 50 parts of water-boron trifluoride complex [$(H_2O)_2.BF_3$], 10 parts of methyl formate and 100 parts of benzene, at a temperature of approximately 30° C. The benzene layer was decanted and the doughy layer remaining was thoroughly washed in methyl formate and allowed to dry giving a substantially quantitative yield of cellulose formate.

Example IV

Into a reactor, which was equipped with a stirrer and with a cooling device, and which contained a methyl formate-boron trifluoride complex ($HCOOCH_3.BF_3$) comprising 68 parts of boron trifluoride and 60 parts of methyl formate, was introduced a slurry comprising 40 parts of water and 10 parts of cellulose. The exothermic heat of the ensuing reaction was absorbed by the cooling device, so that the temperature of the reaction was maintained in the range 25°–35° C. After 15 minutes reaction time a large excess of methyl formate, for example, from 200 to 400 parts, was added to the reaction mixture. The solid portion of the product was then separated from the supernatant liquid, and was washed several times with methyl formate to remove traces of boron trifluoride. The remaining solid was a formic acid-soluble cellulose formate.

As above indicated, by the examples, the cellulose esters are produced by esterifying cellulose, in the presence of a boron trifluoride complex, with an esterification mixture containing, as an esterification reactant, an alkyl ester of an aliphatic acid, with or without the addition of a quantity of aliphatic anhydride less than that theoretically required to react with the available hydroxyl groups of the cellulose. It is to be understood, of course, that the esterification agent comprises the alkyl ester of aliphatic acid may be present as a boron trifluoride complex compound with or without an excess of the said alkyl ester of an aliphatic acid. In the absence of an excess of the said alkyl acid ester, it is desired that the reaction be conducted in the presence of inert organic liquid such, for example, as acetone, chloroform, ethylene chloride, benzene or the like. In any event, the formation of the cellulose ester will take place in the presence of a boron trifluoride complex.

The boron trifluoride complex present in the reaction may be a boron trifluoride complex of an alkyl ester of an aliphatic acid, a boron trifluoride complex of an aliphatic acid or a boron trifluoride complex of water. The formation of the cellulose ester may be carried out in the presence of any one of the following compositions:

1. Boron trifluoride complex of an alkyl ester of an aliphatic acid;
2. An alkyl ester of an aliphatic acid and a water-boron trifluoride complex;
3. An alkyl ester of an aliphatic acid and an aliphatic acid-boron trifluoride complex.

The best results will be obtained by the use of alkyl esters of lower aliphatic acids; i. e., those aliphatic acids having less than 5 carbon atoms in the molecule. As examples of alkyl esters of aliphatic acids suitable for use in accordance with the present invention may be mentioned: Methyl formate, ethyl formate, propyl formate, methyl glycollate, ethyl glycollate, propyl glycollate, methyl methoxy acetate, methyl ethoxy acetate, ethyl methoxy acetate, and the higher alkyl esters of these acetates; as well as the esters of unsubstituted acetic acid and the higher molecular weight organic acids such as propionic, butyric, isobutyric, oxalic, lactic, etc. Reactions of the cellulose with the ester should preferably be conducted in the presence of from 5% to 35% of water.

The above-mentioned boron trifluoride complexes of ester, acid or water may be prepared in any desired manner, for example, by the passing of gaseous boron trifluoride into the ester, acid or water.

The esterification reactions are preferably conducted at a temperature range between 0° C. and 70° C., it being usually desirable to have present an excess of the alkyl ester over and above that amount stoichiometrically required for reacting with the cellulosic material.

The ratio of boron trifluoride complex to cellulosic material treated may vary over a wide range. With highly reactive complexes, i. e., those containing less than 3 mols of acid or ester per mol of boron trifluoride, the complex may range by weight from ½ to 20 parts per part of cellulose; while if the less reactive complexes are employed, i. e., those containing more than 3 mols of acid or ester per mol of boron trifluoride, a somewhat lower range of complex to cellulose is preferably employed, say, from ¼ to 10 parts per part of cellulose treated. Preferably, the boron trifluoride present in the reaction mass should be at least 10% of the weight of the cellulose.

If desired, any of the esterification reactions may be conducted in the presence of an inert organic liquid of the type above set forth. The time of esterification of the cellulose material treated will depend upon the various conditions of the reaction such as the proportion of the reactants, the temperature and the acylating strength of the complex used as the acylating agent. Aliphatic acids and alkyl esters of aliphatic acids generally form one or more complexes with boron trifluoride, for example, acetic acid and propionic acid form complex compounds containing both 1 and 2 mols of the acid per mol of the boron trifluoride. A complex containing 1 mol of acid or ester per mol of boron trifluoride is more powerful and will react with cellulose more rapidly than will a complex containing 2 mols of the acid or ester per mol of the boron trifluoride. The propionic acid-boron trifluoride complexes, as well as complexes of the weaker organic acids with boron trifluoride such, for example, as boron trifluoride complexes of butyric acid and the like do not react with the cellulose as readily as do the complexes of stronger organic acids such as those of formic and glycollic acids. Generally, the reaction may be effected in a period of 0.02 to 4 hours if the temperature is in the neighborhood of 20° to 30° C. There is evidence of esterification directly after mixing the reactants; the softening and increasing stickiness of the fibers begins instantly.

It will be appreciated that many types of organic acid esters of cellulose may be prepared in accordance with the present invention. For example, if the preparation of a cellulose acetobutyrate is desired the cellulosic material may be treated with a mixed complex comprising both acetic acid esters and butyric acid esters, or a cellulose acetate reacted with an alkyl butyrate-boron trifluoride complex. On the other hand, a cellulose butyrate partially acylated may be reacted with an acetic acid ester-boron trifluoride complex to form a cellulose aceto-butyrate. Subsequent to the preparation of the cellulose derivatives the boron trifluoride or boron trifluoride-organic acid, or ester, complexes may be separated from the cellulose ester and used over again for the preparation of additional quantities of a cellulose ester.

Since it is obvious that many changes and modifications can be made in the above-described details without departing from the nature and spirit of the invention, it is to be understood that the invention is not to be limited by these details except as set forth in the appended claims.

I claim:

1. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture containing, as an esterifying reactant, an alkyl ester of an aliphatic acid having less than 5 carbon atoms in the molecule.

2. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture containing, as esterifying reactants, an alkyl ester of an aliphatic acid having less than 5 carbon atoms in the molecule and an aliphatic anhydride, the aliphatic anhydride being present in a quantity less than that theoretically required to react with the hydroxyl groups of the cellulose.

3. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture, the sole esterification reactant of which consists of an alkyl ester of an aliphatic acid having less than 5 carbon atoms in the molecule.

4. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture containing, as an esterifying reactant, an alkyl ester of formic acid.

5. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture, the sole esterification reactant of which consists of an alkyl ester of formic acid.

6. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture containing, as an esterifying reactant, an alkyl ester of acetic acid.

7. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture, the sole esterification reactant of which consists of an alkyl ester of acetic acid.

8. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture, containing, as an esterifying reactant, an alkyl ester of an aliphatic acid having less than 5 carbon atoms in the molecule, forming a structure from the resulting cellulose ester, and converting the cellulose ester structure to regenerated cellulose.

9. The process which comprises esterifying cellulose, in the presence of a boron trifluoride complex selected from the group consisting of complexes of boron trifluoride and an aliphatic acid having less than 5 carbon atoms, complexes of boron trifluoride and an alkyl ester of an aliphatic acid having less than 5 carbon atoms, and complexes of boron trifluoride and water, with an esterification mixture, containing, as an esterifying reactant, an alkyl ester of formic acid, forming a structure from the resulting cellulose formate, and converting the cellulose formate structure to regenerated cellulose.

AMBROSE McALEVY.